Patented Oct. 9, 1951

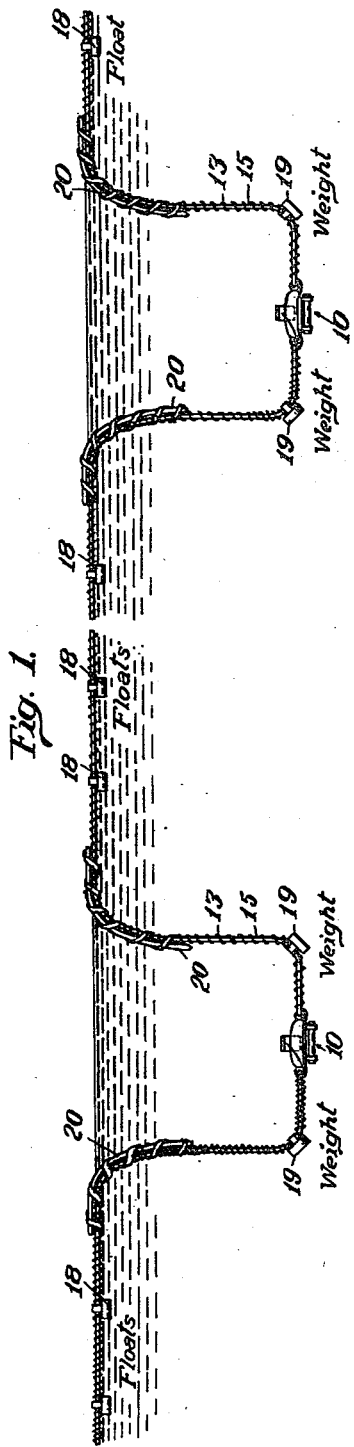
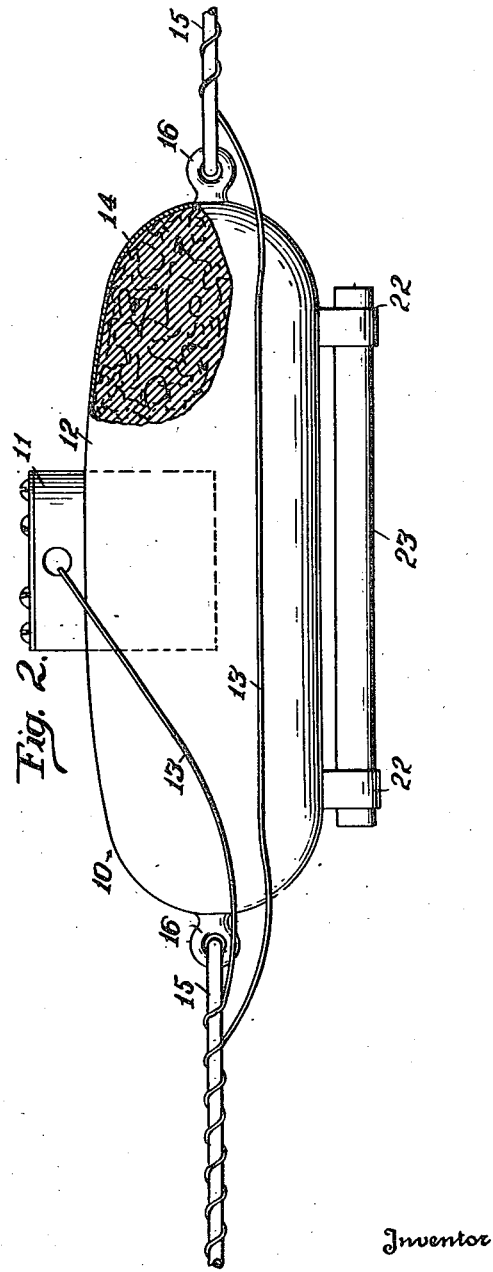

2,570,707

UNITED STATES PATENT OFFICE 2,570,707

SEISMIC SURVEYING

Josephus Overton Parr, Jr., San Antonio, Tex., assignor to Olive S. Petty, San Antonio, Tex.

Application August 16, 1948, Serial No. 44,418

4 Claims. (Cl. 177—352)

This invention relates to improvements in apparatus and methods for conducting seismic surveys of underwater geological formations.

It is common practice in conducting submarine geophysical surveys to locate a plurality of seismic detectors or geophones on a submerged surface, for instance the ocean floor, and to detonate an explosive on or immediately beneath the floor to propagate seismic waves in the earth. The wave energy reflected upwardly by subsurface formations is received at the several detectors, converted into electrical energy, and suitably recorded, the procedure being thus generally similar to that employed in seismic survey on land. The lowering of the detectors and the explosive charge to the bottom is a time-consuming operation, and care must be exercised to avoid errors in subsequent computations as the result of variation in depth of the ocean floor.

It has been proposed to float the detectors on the surface of the water to avoid the difficulties incident to the seating of the detectors on the bottom, and to tow the detectors to different locations behind a towing vessel. I have found, however, that wave action on surfaced detectors increases the noise level to such an extent that the recording of seismic waves in this manner is seldom practical. Difficulties are likewise encountered in systems in which the detectors are mounted in floats anchored by cable to the ocean floor, whether located on the surface or submerged, since considerable noise is caused by eddy currents and other flow of water past the detectors.

The problem presented by relatively high noise levels in such a system is especially acute in operations conducted at a considerable distance offshore, since higher noise levels require larger charges of explosive and the supplying and handling of explosives in rough weather is time-consuming, difficult, and dangerous. It is therefore apparent that acceleration of submarine surveying and elimination of many of the difficulties heretofore encountered urgently require improved methods and apparatus for minimizing noise at the detectors.

It is an object of the invention to achieve effective reduction of noise by submerging the detectors to a predetermined depth, sufficient to avoid direct wave action, and allowing the detectors to drift with water currents during the actual recording. In the preferred embodiment of the invention this result is secured by connecting a plurality of detectors in series in a towing line, the detector and adjacent line sections having such buoyancy as to submerge and drift whenever the line is slackened, the remainder of the line, constituted by that portion which extends between the detectors, being constructed to float on the surface at all times. The detectors are thus suspended by the floating portion of the line at a definite depth established by the length of adjacent line sections of less buoyancy. The explosive charge may then be detonated beneath the surface of the water.

More specifically, it is an object of the invention to provide a towing line of which the major portion is constructed to float, sections of the line adjacent the detectors being weighted to cause the detector to submerge therewith to a predetermined depth. Preferably each detector is carried in a buoyant support, the weight of the assembly, constituted by detector and support, being comparable to that of the water displaced thereby, so that the depth to which the assembly submerges when the line is slackened is determined principally by the distribution of weight in the towing line. For the purpose of maintaining the detector assembly at an upright position at all times, the support may be suitably loaded at its lower side.

It is a feature of the invention that the towing line is supported adjacent the juncture of the floating and the submerging portions thereof by means secured to the line and exerting a buoyant action which is distributed over a substantial length of line. The effect of waves in moving past this portion of the line having distributed buoyancy is to raise and lower the line gradually and to avoid jerks and tugs on the line which would otherwise be transmitted to the detector and recorded, thus tending to obscure the wanted signal energy.

Further objects and features of the invention will be apparent from the following description taken in connection with the accompanying drawings, in which Figure 1 illustrates a supporting system for a plurality of seismic detectors representing a preferred embodiment of the invention; and Figure 2 illustrates a detector assembly suitable for use in the practice of the invention.

To facilitate an understanding of the invention, the illustrated embodiment thereof is described in specific language. No limitation of the invention is thereby intended, it being understood that the principles of the invention may be otherwise applied and that such alterations and further modifications of the illustrated structure are contemplated as might be made by those skilled in the art to which the invention relates.

Referring first to Fig. 1, it will be observed that a plurality of detector assemblies 10 are secured in series in a towing line 15, electrical conductors 13, through which the received signal energy is transmitted to a suitable recorder on the towing vessel, extending along the towing cable, preferably being wrapped around the cable to minimize injury to the conductors. The detector assemblies and the cable are shown in substantially the position which they occupy when the cable is slackened and the assemblies are submerged and drifting, in preparation for the recording of a seismic energy.

In order that the detectors may remain submerged to a predetermined depth, the major portion of the towing line or cable 15 is constructed and arranged to float on the surface, either by virtue of its own buoyancy or by the use of buoyant devices secured thereto. I prefer to employ a metal cable, for instance ⅜-inch stainless steel, to which are secured at intervals, preferably from 5 feet to 8 feet, floats 18 of cork or the like. Adjacent each detector assembly 10 and at each side thereof, for instance at a distance of 30 inches from the detector assembly, is located a weight 19 having sufficient mass to ensure submergence of the detector assembly and the intervening sections of the cable whenever the cable is slack. It will be observed that these adjacent cable sections preferably extend approximately horizontally from the assembly, the assembly being so constructed that its weight is comparable to that of the water which it displaces, having neither substantially less nor substantially greater weight than the displaced water. In adjusting the mass of the detector assembly to achieve this result, the weight of the adjacent cable section and the conductors carried thereby should, of course, be taken into consideration.

At the juncture of the major floating portion of the cable and the submerged, vertically extending portions of the cable immediately above the weights 10, the cable is preferably constructed to provide a distributed buoyant effect. The desired result may readily be achieved by securing to the cable over a considerable portion of its length a rubber tube 20. Excellent results have been secured by the use for this purpose of bicycle inner tubes having a length of 82 inches and a diameter of 2.125 inches, the tubes being cut and the open ends sealed and the tube inflated and taped to the cable, the lower end of each tube being approximately 48 inches from the adjacent weight 19, weighing 2 pounds.

With such an arrangement the detectors may be rapidly towed by the towing vessel from one spread to the next, and as soon as the vessel is stopped and the cable becomes slack, the cable and detector assemblies assume approximately the position represented in Fig. 1, the assembly being thus submerged to a predetermined depth, preferably about 7 feet, but in any event to a depth sufficient to eliminate direct wave action against the detector. When waves pass over the detector, the distributed buoyancy afforded by the tubes 20 causes the cable to rise gradually and without shock, the weight 19 swinging in an arc about the point of attachment of the cable 15 to the detector assembly 10, with the minimum of disturbance of the detector assembly.

The detector assembly may be formed as shown more particularly in Fig. 2, the detector proper 11 being seated in a support 12 comprising a buoyant casing 14, which may be filled with rock wool or the like. The cable 15 is attached to the assembly by means of eyes 16 suitably secured to support 12. Carried at the lower side of support 12 by brackets 22 is an elongated weight 23 having such mass that the assembly and the detector 11 are maintained in an upright position.

As hereinbefore pointed out, it is preferred that the mass of the detector assembly be comparable to that of the mass of water displaced thereby, the assembly being carried downwardly principally by the weights 19. It will be appreciated, however, that the assembly may be somewhat heavier or somewhat lighter provided the general configuration of the cable and assembly does not vary too widely from that shown in Fig. 1.

Reduction of noise by employment of the apparatus and method of invention has given excellent results with explosive charges of only one-thirtieth the size of those required by previous practice in this field.

Having thus described the invention, what is claimed as new and desired to be secured by Letters Patent is:

1. In apparatus for use in seismic surveying of underwater formations, the combination with a plurality of detector assemblies each including a detector and a buoyant support for said detector, of a towing line connecting said detector assemblies in spaced relation, floats secured to a major portion of said line and supporting such major portion of said line at the surface intermediate said detector assemblies, the combined weight of said detector assembly and adjacent sections of said line being not less and not substantially greater than the weight of water displaced by said assembly when completely submerged, and being sufficient to cause said detector assemblies and adjacent sections only of the line to submerge when the line is slack, and buoyant means secured to the line adjacent each end of the floating portion of the line and extending over a substantial length of the floating and submerged portions of the line to distribute the buoyant effect thereof, whereby the passage of waves in the water effects gradual lifting of that portion of the line so buoyed.

2. In apparatus for use in seismic surveying of underwater formations, the combination with a plurality of detector assemblies each including a detector and a buoyant support for said detector, the combined weight of said detector assembly being not substantially greater nor less than the weight of water displaced by said assembly when completely submerged, of a towing line connecting said detector assemblies in spaced relation, buoyant means supporting at the surface the major portion of said line intermediate said detector assemblies, weights on said line adjacent to and at each side of said detectors at points on said line spaced from said detector assemblies, the mass of said weights being sufficient to cause said detector assemblies and that portion only of the line adjacent the detector assemblies to submerge when the line is slack, and buoyant means secured to the line adjacent each end of the major floating portion of the line and extending over a substantial length of the floating and submerged portions of the line to distribute the buoyant effect thereof, whereby the passage of waves in the water effects gradual lifting of that portion of the line so buoyed.

3. In apparatus for use in seismic surveying of underwater formations, the combination with a plurality of detector assemblies each including a detector and a buoyant support for said detector, the combined weight of said detector assembly being not substantially greater nor less than the weight of water displaced by said assembly when completely submerged, of a towing line connecting said detector assemblies in spaced relation, buoyant means supporting at the surface the major portion of said line intermediate said detector assemblies, weights on said line adjacent to and at each side of said detector assemblies at points on said line spaced from said detector assemblies, the mass of said weights being suffiient to cause said detector assemblies and that portion only of the line adjacent the detectors to submerge when the line is slack, and buoyant means secured to the line adjacent each end of the major floating portion of the line and extending over a substantial length of the floating and submerged portions of the line to distribute the buoyant effect thereof, whereby the passage of waves in the water effects gradual lifting of that portion of the line so buoyed, said last named buoyant means comprising an elongated float having substantially uniform density and displacement throughout its length.

4. In apparatus for use in seismic surveying of underwater formations, the combiantion with a plurality of detector assemblies each including a detector and a buoyant support for said detector, the combined weight of said detector assembly being not substantially greater nor less than the weight of water displaced by said assembly when completely submerged, of a towing line directly connecting said detector assemblies in spaced relation, floats secured directly to major portions of said line intermediate and beyond said detector assemblies and supporting such major portions of said line at the surface, weights on said line adjacent to and at each side of and spaced from said detector assemblies at points on said line itnermediate said floats and detector assemblies, the mass of said weights being sufficient to cause said detector assemblies and that portion only of the line adjacent the detector assemblies to submerge only when the line is slack to form at each detector assembly a depressed bight in the towing line, whereby the detector assemblies are surfaced during towing, and conductors extending from each detector along said line.

JOSEPHUS OVERTON PARR, Jr.

REFERENCES CITED

The following references are of record in the file of this patent:

UNITED STATES PATENTS

| Number | Name | Date |
| --- | --- | --- |
| 1,470,733 | Hayes | Oct. 16, 1923 |
| 2,241,428 | Silverman | May 13, 1941 |
| 2,324,378 | Flude | July 13, 1943 |
| 2,423,591 | Flude | July 8, 1947 |
| 2,440,903 | Massa | May 4, 19448 |
| 2,449,085 | Peterson | Sept. 14, 1948 |
| 2,465,696 | Paslay | Mar. 29, 1949 |